(12) United States Patent
Yokoyama (10) Patent No.: US 7,626,771 B2
(45) Date of Patent: Dec. 1, 2009

(54) OPTICAL SYSTEM AND OPTICAL APPARATUS INCLUDING THE SAME

(75) Inventor: Takayoshi Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/329,130

(22) Filed: Dec. 5, 2008

(65) Prior Publication Data

US 2009/0147380 A1   Jun. 11, 2009

(30) Foreign Application Priority Data

Dec. 5, 2007   (JP) .............................. 2007-314595

(51) Int. Cl.
*G02B 9/00*   (2006.01)
(52) U.S. Cl. .................... 359/754; 359/784; 359/785
(58) Field of Classification Search ................. 359/754, 359/784, 785, 773, 774, 772, 689, 690
See application file for complete search history.

(56) References Cited

U.S. PATENT DOCUMENTS

| | | | |
|---|---|---|---|
| 4,241,983 A | 12/1980 | Kitagishi | |
| 7,057,831 B2 | 6/2006 | Ogawa | |
| 7,136,237 B2 | 11/2006 | Ogawa | |
| 7,164,544 B2 | 1/2007 | Ogawa | |
| 7,193,789 B2 | 3/2007 | Maetaki | |
| 2009/0168179 A1* | 7/2009 | Toyoda | ....................... 359/557 |

FOREIGN PATENT DOCUMENTS

| | | |
|---|---|---|
| JP | 55-036886 A | 3/1980 |
| JP | 11-119092 A | 4/1999 |
| JP | 11-316341 A | 11/1999 |
| JP | 2000-089101 A | 3/2000 |
| JP | 2005-181392 A | 7/2005 |
| JP | 2005-215387 A | 8/2005 |
| JP | 2006-145823 A | 6/2006 |
| JP | 2006-349948 A | 12/2006 |

* cited by examiner

*Primary Examiner*—Timothy J Thompson
(74) *Attorney, Agent, or Firm*—Canon U.S.A., Inc., IP Division (57) ABSTRACT

An optical system in which a maximum value of a height from an optical axis of a paraxial marginal ray closer to an expanded side than a point of intersection between an optical axis and a paraxial chief ray, includes a lens unit Lr including at least one refractive optical element Gn of a negative refractive power. In the optical system, vd (Gn) as an Abbe number of a material of the refractive optical element Gn, θgF (Gn) as a partial dispersion ratio regarding g and F-lines, FGn as a focal lengths of the refractive optical element Gn, and Fr as focal lengths of the lens unit Lr are set appropriately.

12 Claims, 6 Drawing Sheets

OPTICAL SYSTEM AND OPTICAL APPARATUS INCLUDING THE SAME

BACKGROUND OF THE INVENTION

1. Field of the Invention

The present invention relates to an optical system and an optical apparatus including the same, for example, an optical apparatus such as a silver film camera, a digital still camera, a video camera, a telescope, a binocular, a projector, or a copying machine.

2. Description of the Related Art

The optical system used for the optical apparatus such as a digital camera or a video camera has to be short in total lens length (total optical system length: length from first lens surface of object side to image surface), and small in overall size.

Generally, as the optical system is smaller, more aberrations, in particular chromatic aberrations such as on-axis chromatic aberrations or magnification chromatic aberrations occur, to reduce optical performance.

In the optical system of a telephoto type (telephotographic) where a total lens length is shortened, in particular, more chromatic aberrations occur as a focal length is extended more (lengthened more).

As a method for reducing such chromatic aberrations, an optical system has been known, which performs achromatization (achromatic correction) by using an abnormal partial dispersed material for a lens material.

In the optical system of the telephoto type, to correct chromatic aberrations, a positive lens made of a low dispersed material such as a fluorite having abnormal partial dispersion for a lens group of the optical system front side where heights of a paraxial marginal ray and a paraxial chief ray from an optical axis are both high can be used.

An optical system of a telephoto type has been known, which corrects chromatic aberrations by using a material having abnormal partial dispersion (Published Japanese Patent No. 60-49883 and Japanese Patent Laid-Open No. 11-119092).

Further, an optical system has been known, which performs achromatization by using, as a solid-state material having abnormal partial dispersion characteristics, a solid-state material made of a mixture containing dispersed indium-tin oxide (ITO) fine particles for a transparent medium (Japanese Patent Laid-Open Nos. 2005-181391 and 2005-215387).

Further, an optical system which performs achromatization by using, as a solid-state material having abnormal partial dispersion characteristics, a solid-state material made of a mixture containing dispersed $TiO_2$ fine particles for a transparent medium has been known (See Japanese Patent Laid-Open Nos. 2006-14582 and 2006-3499948).

On the other hand, focusing in an image-taking optical system (an optical system) used for an image-taking apparatus such as a camera is performed by using a method which moves the entire image-taking optical system or a partial lens group of the image-taking optical system in many cases.

An image-taking optical system of a telephoto type having a long focal length is generally large in size, and heavy in weight. Thus, it is mechanically difficult to perform focusing by using the entire image-taking optical system. As a result, many image-taking optical systems of telephoto types use an inner-focusing system which performs focusing by using a relatively small and light lens group other than a lens group of the image-taking optical system closest to an object.

An image-taking optical system has been known, which includes three lens groups: sequentially from an object side to an image side, a first lens group of a positive refractive index, a second lens group of a negative refractive index, and a third lens group of a positive refractive index, and performs focusing by moving the second lens group on an optical axis (See Japanese Patent Laid-Open No. 11-316341).

An optical system of an inner-focusing type has been additionally known, which includes, sequentially from an object side to an image side, first to fifth lens groups of positive, negative, positive, negative, and positive refractive indices, and performs focusing by moving the second lens group on an optical axis (See Japanese Patent Laid-Open No. 2000-89101).

In the optical system of Japanese Patent Laid-Open No. 2000-89101, the fourth lens group is moved in a direction perpendicular to the optical axis to correct image blurring generated when the optical system vibrates, in other words, to perform vibration prevention.

In the optical system of the telephoto type, chromatic aberrations can be remedied while shortening a total lens length, for example, by using a lens made of a fluorite having abnormal partial dispersion characteristics and increasing a refractive power of the lens. However, in a lens made of a low-dispersed glass such as a fluorite having a large Abbe number, when a refractive power is increased to correct chromatic aberrations, aberrations other than the chromatic aberrations, such as spherical aberrations, coma aberrations, or astigmatism occur by a large number.

Number of lenses having abnormal partial dispersion characteristics has to be increased in order to correct these aberrations concurrently with the chromatic aberrations. However, the increased number of lenses leads to enlargement of the entire optical system and an increase in weight.

A glass material such as a fluorite having abnormal partial dispersion characteristics can not be repeatedly used because the processing is extremely difficult and a surface can be easily damaged.

As materials which indicates abnormal partial dispersion characteristics, solid-state materials such as $TiO_2$, ITO, and a UV-curing resin disclosed in Japanese Patent Laid-Open Nos. 2005-215387, 2006-145823, and 2006-349948 can be used in order to achromatize the optical system.

When a refractive optical element made of such an effective solid-state material having abnormal partial dispersion characteristics is used in the optical system, it is important to appropriately set a position in an optical path, a refractive power or the like.

Inappropriate setting of such conditions leads to a difficulty of obtaining high optical performance by miniaturizing the entire optical system and correcting chromatic aberrations well.

SUMMARY OF THE INVENTION

The present invention provides an optical system which can correct various aberrations such as chromatic aberrations well, has a compact structure as a whole, and exhibits high optical performance, and an optical apparatus including the optical system.

An optical system of the present invention, in which a maximum value of a height from an optical axis of a paraxial marginal ray closer to an expanded side than a point P, P denoting a point of intersection between an optical axis and a paraxial chief ray, and in a lens surface of the expanded side is larger than a maximum value of a height from an optical axis closer to a reduced side than the point P in which the paraxial marginal ray passes through the lens surface, includes, closer to the reduced side than the point P, a lens group Lr including at least one refractive optical element Gn of a negative refractive power in which light entrance and exit surfaces are both refractive surfaces made of solid-state materials. When an Abbe number of a material of the refractive optical element Gn is νd (Gn), a partial dispersion ratio regarding g and F-lines is θgF (Gn), and focal lengths of the refractive optical element Gn is FGn a focal lengths of the lens group Lr is Fr, the following conditions are satisfied:

$-2.100 \times 10^{-3} \cdot \nu d(Gn) + 0.693 < \theta gF(Gn)$ $0.55 < \theta gF(Gn) < 0.90$ $0.02 < |FGn/Fr| < 10.00$ Further features of the present invention will become apparent from the following description of exemplary embodiments (with reference to the attached drawings)

DESCRIPTION OF THE EMBODIMENTS

Embodiments of an optical system and an optical apparatus including the same according to the present invention will be described.

The optical system of the present invention is directed to an optical system of a telephoto type (telephotographic). The optical system of the invention has the following characteristics.

A point of intersection between an optical axis and a paraxial chief ray is denoted by P. In this case, a maximum value of a height from an optical axis of a paraxial marginal ray closer to an expanded side than the point P and in a lens surface closest to the expanded side is larger that that of a height from an optical axis of a paraxial marginal ray closer to a reduced side than the point P and passing through the lens surface. Closer to the reduced side than the point P, a lens group Lr including at least one refractive optical element Gn of a negative refractive power where light entrance and exit surfaces are both refractive surfaces made of solid-state materials is disposed.

Figure 1:
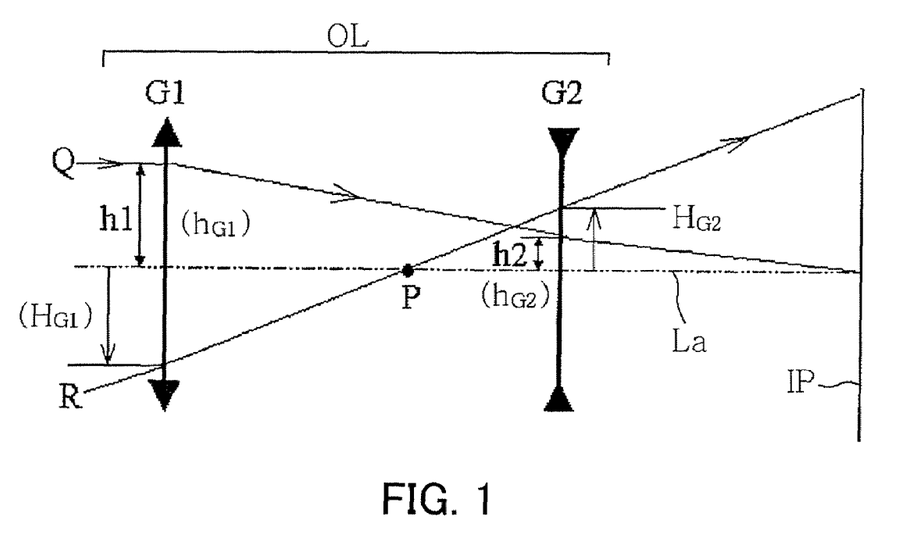
FIG. 1 is a schematic paraxial arrangement which describes how an optical system of the present invention acts.

FIG. 1 is a schematic view of a paraxial refractive power arrangement which describes an optical action of the optical system of the telephoto type of the present invention.

Figure 2:
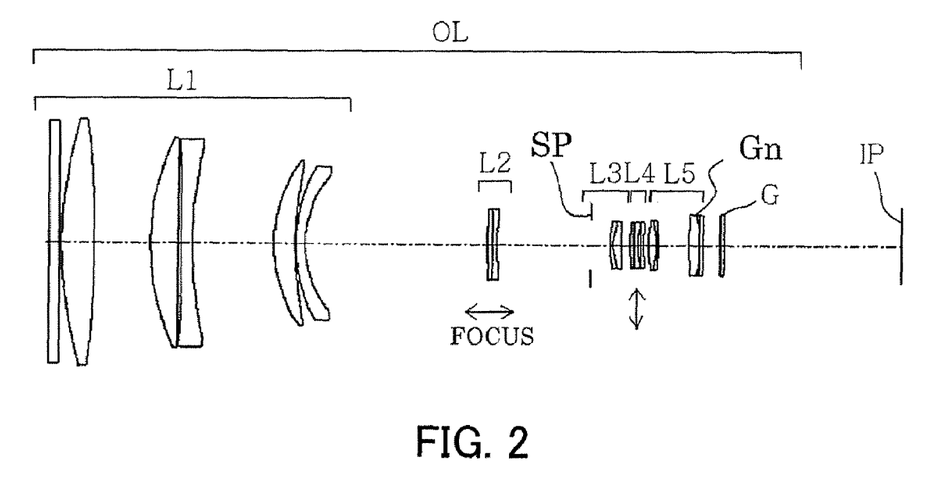
FIG. 2 is a sectional view showing an optical system of a first numeral value embodiment (numerical value embodiment 1).
Figure 3:
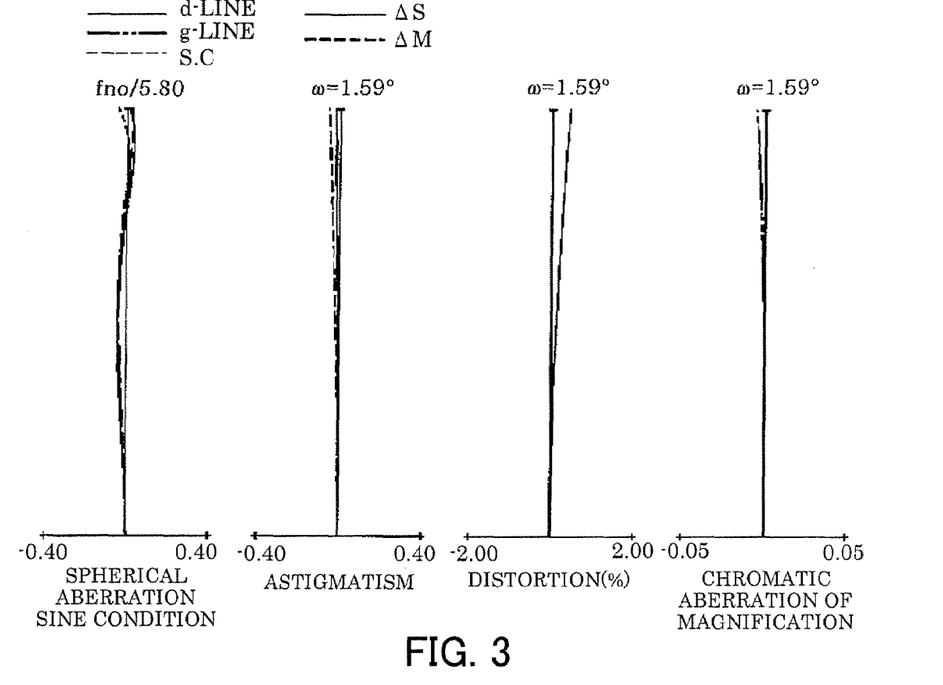
FIG. 3 is an aberration diagram in an infinite distance focused state of the numerical value embodiment 1.

FIG. 2 is a sectional view showing a lens of an optical system of Embodiment 1. FIG. 3 is an aberration diagram when the optical system of Embodiment 1 is focused on an infinite distance object.

Figure 4:
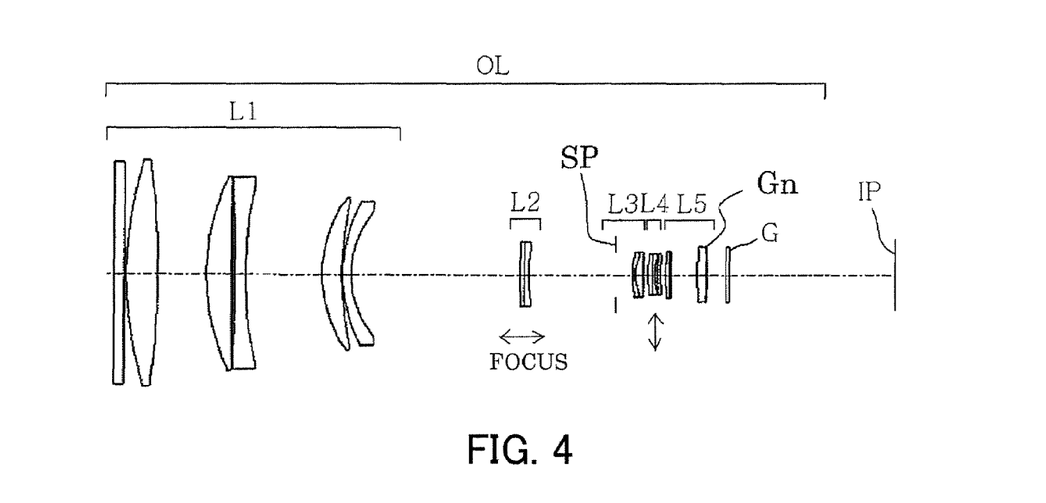
FIG. 4 is a sectional view showing an optical system of a second numerical value embodiment 2.
Figure 5:
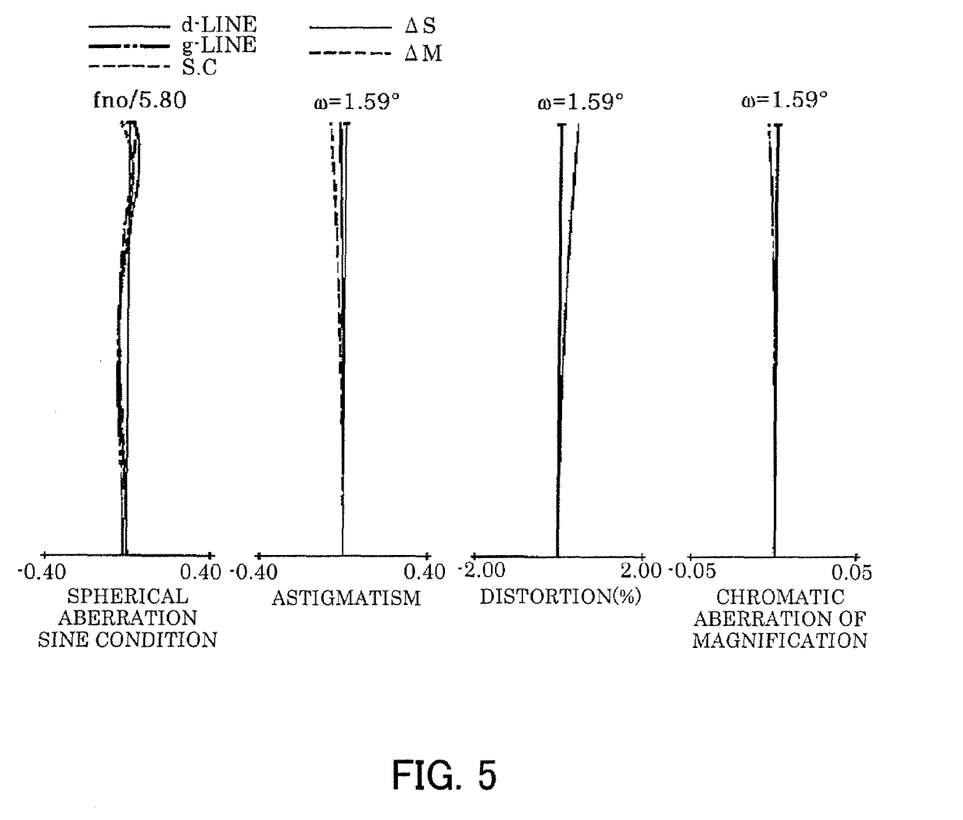
FIG. 5 is an aberration diagram in an infinite distance focused state of the numerical value embodiment 2.

FIG. 4 is a sectional view showing a lens of an optical system of Embodiment 2. FIG. 5 is an aberration diagram when the optical system of Embodiment 2 is focused on an infinite distance object.

Figure 6:
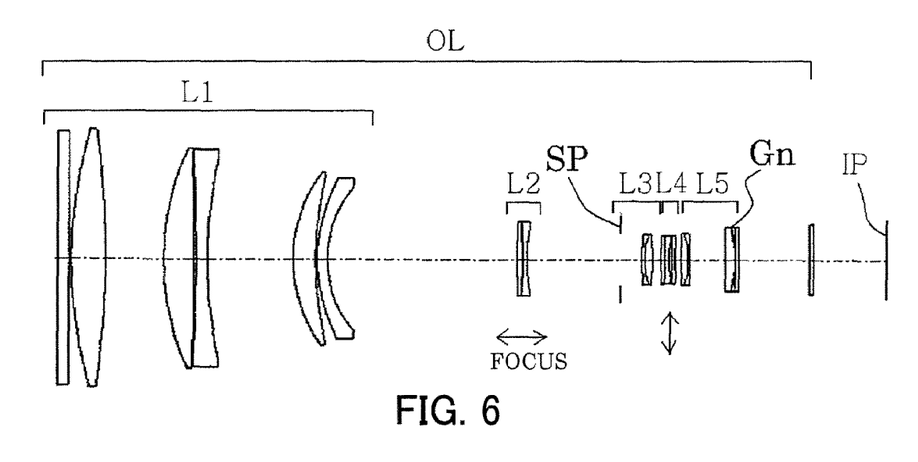
FIG. 6 is a sectional view showing an optical system of a third numerical value embodiment (numerical value embodiment 3).
Figure 7:
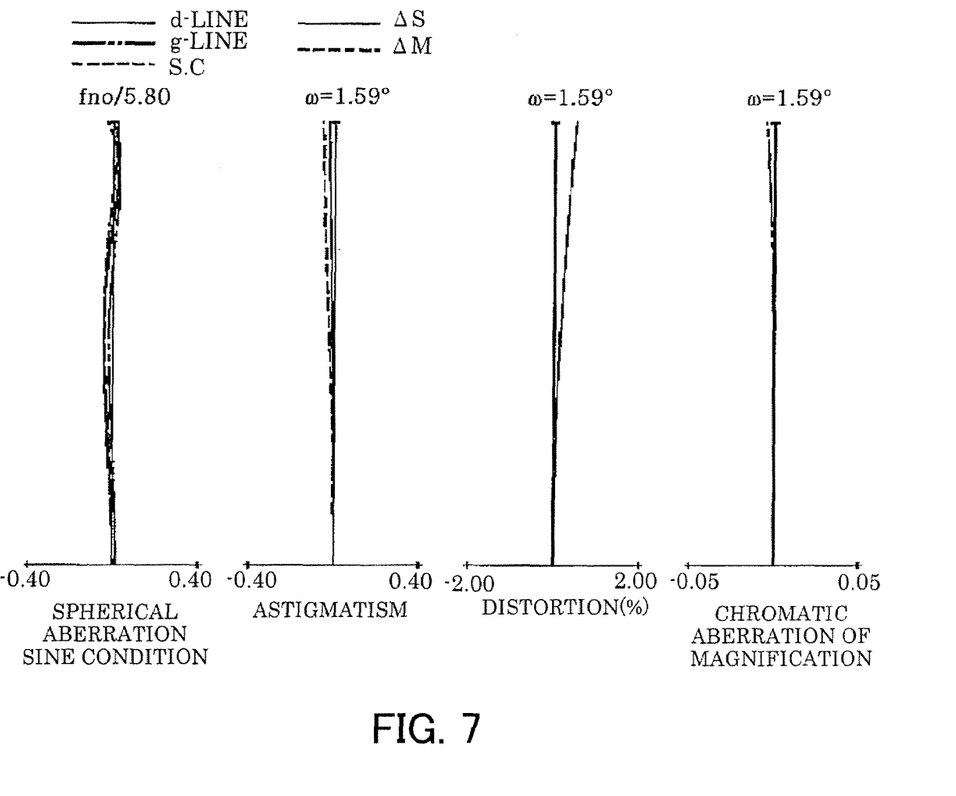
FIG. 7 is an aberration diagram in an infinite distance focused state of the numeral value embodiment 3.

FIG. 6 is a sectional view showing a lens of an optical system of Embodiment 3. FIG. 7 is an aberration diagram when the optical system of Embodiment 3 is focused on an infinite distance object.

Figure 8:
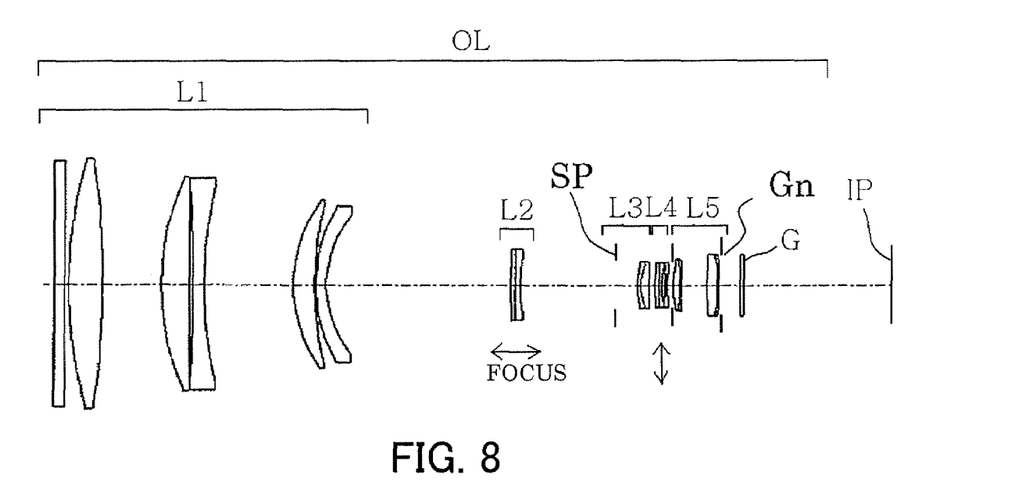
FIG. 8 is a sectional view showing an optical system of a fourth numerical value embodiment (numerical value embodiment 4).
Figure 9:
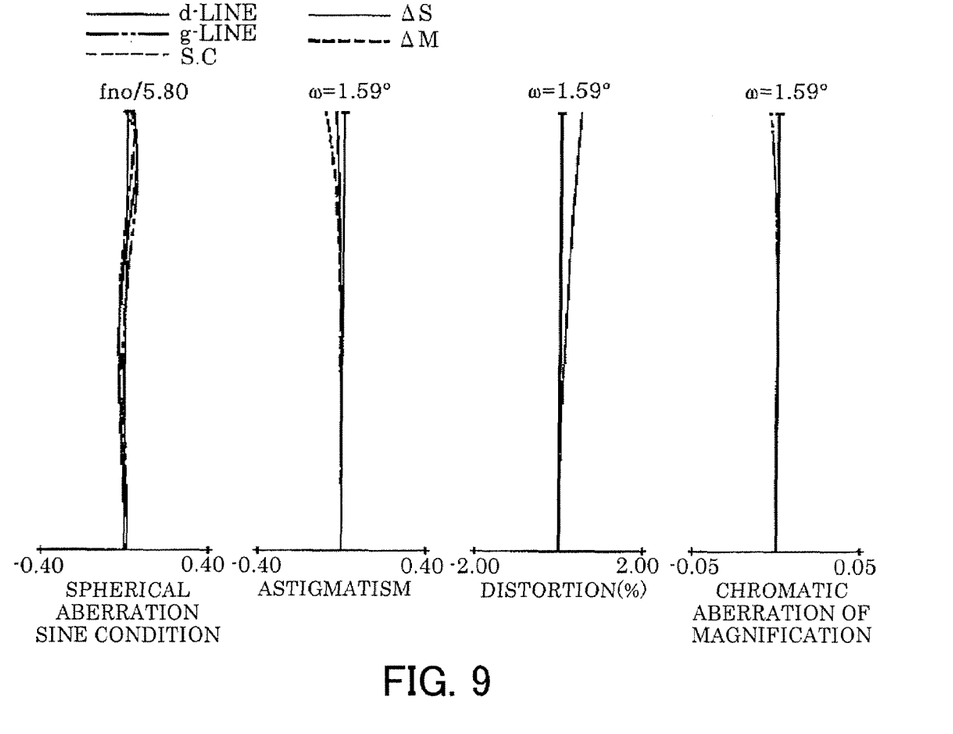
FIG. 9 is an aberration diagram in an infinite distance focused state of the numerical value embodiment 4.

FIG. 8 is a sectional view showing a lens of an optical system of Embodiment 4. FIG. 9 is an aberration diagram when the optical system of Embodiment 4 is focused on an infinite distance object.

Figure 10:
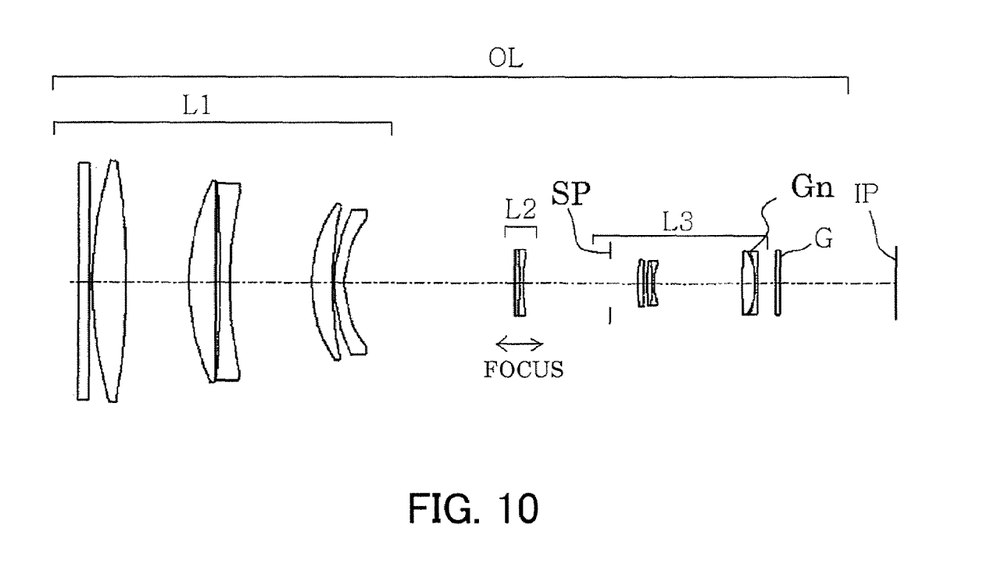
FIG. 10 is a sectional view showing an optical system of a fifth numerical value embodiment (numerical value embodiment 5).
Figure 11:
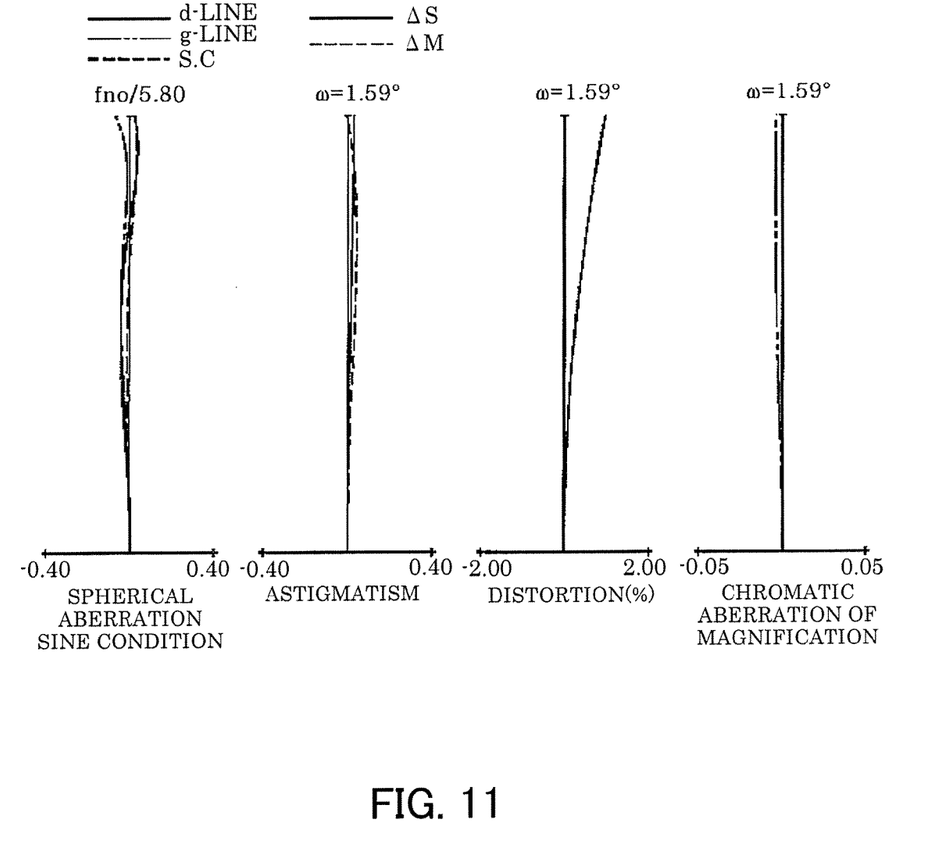
FIG. 11 is an aberration diagram in an infinite distance focused state of the numerical value embodiment 5.

FIG. 10 is a sectional view showing a lens of an optical system of Embodiment 5. FIG. 11 is an aberration diagram when the optical system of Embodiment 5 is focused on an infinite distance object.

Figure 12:
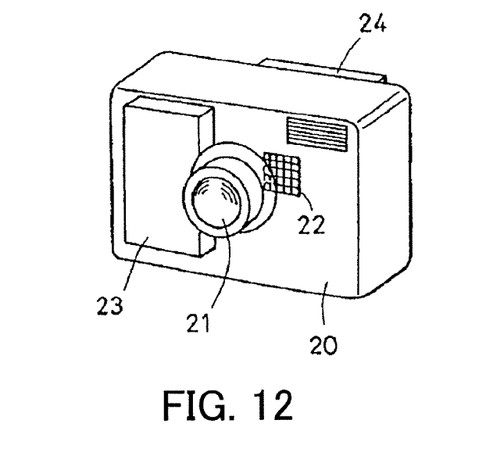
FIG. 12 is a schematic view showing main portions of an image-taking apparatus of the present invention.

FIG. 12 is a schematic view showing main portions of a camera (image-taking apparatus) which includes the optical system of the present invention.

The optical system of each embodiment is an image-taking lens system of a telephoto type, and used for an image-taking apparatus such as a video camera, a digital camera, and a silver film camera. In the lens sectional view, a left side is an object side (front) and a right side is an image side (rear).

When the optical system of each embodiment is used as a projection lens of a projector, the left side is a screen, and the right side is a projected image.

In FIG. 1 and in the lens sectional view, a reference character OL denotes an optical system, a reference character i denotes an order of lens groups from the object side, and a reference character Li denotes an i-th lens group.

A reference character SP denotes an aperture stop. A reference character IP denotes an image plane (image surface). In use as an image-taking system of a video camera or a digital still camera, an imaging plane of a solid-state image-taking element (photoelectric conversion element) such as a CCD sensor or a CMOS sensor is placed at the image plane. In use as a silver film camera, a photosensitive surface corresponding to a film surface is placed In the aberration diagram, d and g respectively represent a d-line and g-line. ΔM and ΔS respectively represent a meridional image surface and a sagittal image surface. Chromatic aberration of magnification is represented by the g-line. Reference characters ω and Fno respectively denote a half-field angle and an F-number.

First, an optical operation of the optical system of the present invention shown in FIG. 1 will be described. In FIG. 1, reference numerals G1 and G2 respectively denote a front group of a positive refractive power (first lens group) and a rear group of a negative refractive power (second lens group) which constitute the optical system OL of the telephoto type. For easier understanding, lenses of the front and rear groups G1 and G2 are all single lenses, and disposed on an optical axis at lens intervals of 0 in the front and rear groups G1 and G2.

Reference characters Q and R respectively denote a paraxial on-axis beam and a pupil paraxial beam, and reference character P denotes a point of intersection between the pupil paraxial beam and an optical axis La. The front group G1 side of the point P is an expanded side (object side), and the rear group G2 side of the point P is a reduced side (image side).

The paraxial on-axis beam Q is a paraxial beam when a focal length of the entire optical system is normalized to 1, and a light of a height 1 from the optical axis enters in parallel to the optical axis of the optical system. It is presumed hereinafter that an object is present on the left side of the optical system, and a beam enters the optical system from the object side advances from left to right. The pupil paraxial beam is a paraxial beam which passes through a point of intersection between an entrance pupil and the optical axis of the optical system among beams enter at −45° to the optical axis when a focal length of the entire optical system is normalized to 1.

The optical system of each Embodiment includes, closer to the object side than the point P, a lens group Lr including at least one refractive optical element Gn of a negative refractive power where light entrance and exit surfaces are both refractive surfaces made of solid-state materials.

The optical system of the present invention shown in FIG. 1 includes, sequentially from the object side to the image side, a first lens group of a positive refractive power and a second lens group of a negative refractive power. In this case, the optical system may include one or more, or no lens groups on the image side (reduced side) of the second lens group.

The optical system includes an aperture stop in an optical path (position of the point P). Closer to the reduced side than the aperture stop, the optical system includes a lens group Lr including at least one refractive optical element Gn of a negative refractive power where light entrance and exit surfaces are both refractive surfaces made of solid-state materials.

The solid-state material of the refractive optical element used for the optical system of the present invention is a solid material in a state of using the optical system. Any state is used before the optical system is used, for example, duding manufacturing.

For example, even a material liquid during manufacturing and then cured to be a solid-state material falls under the category of the solid-state material.

In each Embodiment, an Abbe number of the material of the refractive optical element Gn, and a partial dispersion ratio regarding G-line and F-line are respectively denoted by $vd(Gn)$ and $\theta gF(Gn)$.

Focal lengths of the refractive optical element Gn and the lens group Lr including the refractive optical element Gn are respectively denoted by FGn and Fr. In this case, the following conditions are satisfied:

$$-2.100 \times 10-3 \cdot vd(Gn)+0.693 < \theta gF(Gn) \quad (1)$$

$$0.55 < \theta gF(Gn) < 0.90 \quad (2)$$

$$0.02 < |FGn/Fr| < 10.00 \quad (3)$$

Abnormal partial dispersion characteristics and an Abbe number of the refractive optical element Gn used for the optical system of Embodiment are as follows.

Refractive indices for a g-line (wavelength 435.8 nm), an F-line (wavelength 486.1 nm), a d-line (wavelength 587.6 nm), and a C-line (wavelength 656.3 nm) of Fraunhofer lines are respectively denoted by Ng, NF, Nd, and Nc. A partial dispersion ratio $\theta gd$ regarding the Abbe number vd and the g-line and d-line, and a partial dispersion ratio $\theta gF$ regarding the g-line and F-line are as follows:

$$vd=(Nd-1)/(NF-NC)$$

$$\theta gd=(Ng-Nd)/(NF-NC)$$

$$\theta gF=(Ng-NF)/(NF-NC)$$

The optical system OL of each of Embodiments 1 to 4 shown in FIGS. 2, 4, 6, and 8 includes, sequentially from the object side to the image side, a first lens group L1 of a positive refractive power which is immobile during focusing, and a second lens group L2 of a negative refractive power which moves in an optical axis direction for focusing. The optical system includes an aperture stop SP, and a third lens group L3 of a positive refractive power which is immobile during focusing.

The optical system further includes a fourth lens group L4 of a negative refractive power which moves to have a component in a direction perpendicular to the optical axis, thereby displacing an image, and a fifth lens group L5 of a positive refractive power which is immobile during focusing.

The refractive optical element Gn that satisfies the conditional expressions (1) to (3) is disposed on the image side of the third lens from the object side of the fifth lens group L5.

The second lens group L2 moves to the image side during focusing from an infinite distance object to a short distance object.

In Embodiments 1 and 2, materials of the refractive optical elements Gn are UV-curing resins. In Embodiments 3 and 4, materials of the refractive optical elements Gn are respectively TiO2, and a 3%-UV-curing resin 2.

The optical system OL of Embodiment 5 includes, sequentially from an object side to an image side, a first lens group L1 of a positive refractive power which is immobile during focusing, and a second lens group L2 of a negative refractive power which moves in an optical axis direction for focusing. The optical system OL includes an aperture stop SP, and a third lens group L3 of a positive refractive power which is immobile during focusing.

The refractive optical element Gn that satisfies conditional expressions (1) to (3) is disposed on the image side of the fourth lens from the object side of the third lens group L3.

A material of the refractive optical element Gn is a UV-curing resin.

The second lens group L2 moves to the image side during focusing from an infinite distance object to a short distance object.

In Embodiment 4, at least one of light entrance surfaces of the refractive optical element Gn is formed into an aspherical shape to secure good optical performance.

In Embodiments 2 and 4, at least one of light entrance surfaces of the refractive optical element Gn is in contact with air.

Next, technical meanings of the conditional expressions (1) to (3) will be described.

The conditional expressions (1) to (3) pertain to the refractive optical element Gn, and are provided to optimally correct magnification chromatic aberrations. The conditional expressions (1) and (2) pertain to abnormal partial dispersion characteristics of the refractive optical element Gn. In the conditional expression (1), when a partial dispersion ratio $\theta gF(Gn)$ drops below a lower limit value, abnormal partial dispersibility of the refractive optical element Gn is reduced, causing a difficulty of correcting a secondary spectrum of magnification chromatic aberrations most of which are generated in the first lens group L1.

When the partial dispersion ratio drops below a lower limit value of the conditional expression (2), the abnormal partial dispersibility of the refractive optical element Gn becomes excessively small, causing a difficulty of correcting a secondary spectrum of magnification chromatic aberrations most of which are generated in the first lens group L1. When the partial dispersion ratio exceeds an upper limit value of the conditional expression (2), the abnormal partial dispersibility of the refractive optical element Gn becomes excessively large, causing excessive correction of a secondary spectrum of magnification chromatic aberrations.

The conditional expression (3) pertains to an optimal refractive power to be supplied to the refractive optical element Gn. When the partial dispersion ratio drops below a lower limit value of the conditional expression (3), a refractive power of the refractive optical element Gn becomes excessively high, causing excessive correction of a secondary spectrum of magnification chromatic aberrations. When the partial dispersion ratio exceeds an upper limit value, the refractive power of the refractive optical element Gn becomes excessively low, causing a correction shortage of the secondary spectrum of the magnification chromatic aberrations.

In the conditional expression (3), the lens group Fr defines a focal length of a group including the refractive optical element Gn. The lens group herein defines a set of lenses moved together (integrally) during focusing, zooming, or vibration prevention, or a set of lenses fixed in positions before or after the lens group as a lens group.

For example, in each of Embodiments 1 to 4, the optical system includes the lens groups of positive, negative, positive, negative, and positive refractive powers sequentially from the expanded side to the reduced side, and prevents vibrations by performing focusing via the second lens group L2, and moving the fourth lens group L4 to have a component in a direction perpendicular to the optical axis.

In each of Embodiments 1 to 4, the disposition of the refractive optical element Gn in the fifth lens group L5 enables good correction of magnification chromatic aberrations. Thus, the lens group including the refractive optical element Gn in the conditional expression (3) is the fifth lens group L5.

In Embodiment 5, the optical system includes lens groups of positive, negative, and positive refractive powers sequentially from the expanded side to the reduced side, and performs focusing by the second lens group L2. In this optical system, a refractive optical element Gn is disposed in the third lens group L3 to enable good correction of magnification chromatic aberrations.

Thus, the lens group including the refractive optical element Gn in the conditional expression (3) is the third lens group L3.

In each Embodiment, the conditional expressions (1) to (3) are satisfied to shorten a total lens length and to miniaturize and reduce the weight of the focusing lens group, thereby collecting deteriorated magnification chromatic aberrations. As a result, an optical system capable of performing not only achromatization in two wavelengths but also good correction of magnification chromatic aberrations in a wide wavelength band from a g-line to a c-line is achieved.

The conditional expression (1) employs the following numerical value range to facilitate better correction of chromatic aberrations:

$$-2.100 \times 10^{-3} \cdot vd(Gn) + 0.693 < \theta gF(Gn) < -1.231 \times 10^{-3} \cdot vd(Gn) + 0.900 \quad (1a)$$

Preferably, the conditional expression (1) employs the following range:

$$-2.100 \times 10^{-3} \cdot vd(Gn) + 0.693 < \theta gF(Gn) < -1.231 \times 10^{-3} \cdot vd(Gn) + 0.823 \quad (1b)$$

More preferably, the conditional expression (1) employs the following range:

$$-1.682 \times 10^{-3} \cdot vd(Gn) + 0.700 < \theta gF(Gn) < -1.682 \times 10^{-3} \cdot vd(Gn) + 0.756 \quad (1c)$$

The conditional expression (2) employs the following numerical value range by satisfying one of the conditional expressions (1) and (1a) to (1c), whereby better chromatic aberration correction effects can be expected:

$$0.555 < \theta gF(Gn) < 0.860 \quad (2a)$$

Further, the conditional expression (2) can employ the following range:

$$0.555 < \theta gF(Gn) < 0.800 \quad (2b)$$

The conditional expression (3) employs the following numerical value range, whereby better chromatic aberration correction effects can be expected:

$$0.025 < |FGn/Fr| < 8.00 \quad (3a)$$

Further, the conditional expression (3) can employ the following range:

$$0.030 < |FGn/Fr| < 5.00 \quad (3b)$$

Thus, each Embodiment can provide a high-performance optical system capable of correcting various aberrations such as chromatic aberrations well by shortening the total length, reducing the weight of the entire system, and achieving a high focusing speed.

The optical system of the present invention can be achieved by satisfying the aforementioned conditions. More preferably, the optical system satisfies one or more of the conditions.

A partial dispersion ratio regarding the g-line and d-line of the refractive optical element Gn is denoted by θgd (Gn).

For the lens group Lr including the refractive optical element Gn, an average Abbe number of materials of the lenses of positive refractive powers is denoted by Vp, and an average Abbe number of materials of the lenses of negative refractive powers is denoted by Vn.

Focal lengths of the first and second lens groups L1 and L2, and the entire system are respectively denoted by F1, F2, and F.

In this case, one or more of the following conditions can be satisfied:

$$vvd(Gn) < 60 \quad (4)$$

$$-2.407 \times 10^{-3} \cdot vd(Gn) + 1.420 < \theta gd(Gn) \quad (5)$$

$$1.255 < \theta gd(Gn) < 1.670 \quad (6)$$

$$0.8 < Vp/Vn < 1.8 \quad (7)$$

$$0.2 < F1/F < 0.7 \quad (8)$$

$$0.1 < |F2/F| < 0.5 \quad (9)$$

Satisfying the conditional expression (4) by an Abbe number of a material of the refractive optical element Gn further facilitates better correction of magnification chromatic aberrations.

Satisfying the conditional expressions (5) and (6) by solid-state materials further facilitates better correction of magnification chromatic aberrations.

The conditional expressions (5) and (6) pertain to abnormal partial dispersion characteristics of the refractive optical element Gn. In the conditional expression (5), when a partial dispersion ratio θgd (Gn) drops below a lower limit value, abnormal partial dispersibility of the refractive optical element Gn is reduced, causing a difficulty of correcting a secondary spectrum of magnification chromatic aberrations most of which are generated in the first lens group.

When the partial dispersion ratio drops below a lower limit value of the conditional expression (6), abnormal partial dispersibility of the refractive optical element Gn becomes excessively small, causing a difficulty of correcting a secondary spectrum of magnification chromatic aberrations most of which are generated in the first lens group L1.

When the partial dispersion ratio exceeds an upper limit value of the conditional expression (6), abnormal partial dispersibility of the refractive optical element Gn becomes excessively large, causing excessive correction of a secondary spectrum of magnification chromatic aberrations.

Generally, in the telephoto-type optical system of an inner focusing system, magnification chromatic aberrations generated in the first lens group closest to the object are canceled by magnification chromatic aberrations generated in the second lens group and the last lens group closest to the image, thereby reducing magnification chromatic aberrations of the entire system.

To miniaturize the focusing lens group, the focusing lens group is disposed near the aperture stop. In the vicinity of the aperture stop, generally, a height from the optical axis of a paraxial chief ray is low. Thus, the disposition of the focusing lens group near the aperture stop reduces the amount of magnification chromatic aberrations generated in the focusing lens group.

Consequently, the magnification chromatic aberration generated in the first lens group have to be canceled by only magnification chromatic aberrations of the last lens group closest to the image, causing a correction shortage of magnification chromatic aberrations. Especially, the generation of a secondary spectrum of the magnification chromatic aberrations generated in the first lens group is large, and a correction shortage of the secondary spectrum deteriorates optical performance.

Thus, the secondary spectrum generated in the first lens group itself has to be reduced. The secondary spectrum can be reduced by increasing a refractive power of the lens made of a fluorite having abnormal partial dispersibility and used for the first lens group. However, dispersion of such a nitric material is low. Consequently, correction of magnification chromatic aberrations necessitates a high refractive power, causing deterioration of various aberrations other than chromatic aberrations such as spherical aberrations, coma aberrations, and astigmatism.

Disposing a lens made of a fluorite having a negative refractive power and abnormal partial dispersibility in the last lens group enables reduction of chromatic aberrations. However, because of its low dispersion, the refractive power is increased to cause deterioration of various aberrations.

Particularly, shortening the total length of the optical system increases the amount of chromatic aberrations in the first lens group to cause a difficulty of simultaneously correcting chromatic aberrations and other aberrations.

In each Embodiment, the second lens group is moved in the optical axis direction by satisfying the conditional expression (7), thereby performing focusing.

This system enables reduction of an effective diameter of the focusing lens group for the lens group of the optical system located closest to the object or the focusing type optical system for drawing out all the lenses. As a result, for example, when the optical system is applied to a camera including an automatic focusing detector, a driving motor can be miniaturized.

The conditional expression (7) is desirable for reducing the lens effective diameter of the focusing lens group. To miniaturize the focusing lens group, the focusing lens group is disposed near the aperture stop. For realizing the miniaturization, magnification chromatic aberrations generated in the first lens group L1 of a positive refractive power have to be canceled only by the last lens group closest to the image (fifth lens group L5 in Embodiments 1 to 4, and third lens group L3 in Embodiment 5). Accordingly, many positive magnification chromatic aberrations have to be generated in the last lens group.

The conditional expression (7) is for realizing the above. Below a lower limit value of the conditional expression (7), the amount of magnification chromatic aberrations generated in the last lens group becomes excessive, deteriorating magnification chromatic aberrations in the entire lens system.

Over an upper limit value, the amount of magnification chromatic aberrations generated in the last lens group becomes excessively small, causing a difficulty of canceling magnification chromatic aberrations generated in the first lens group L1. In consequence, magnification chromatic aberrations in the entire lens system are deteriorated.

The conditional expressions (8) and (9) are mainly for shortening the total lens length and reducing weight.

To achieve miniaturization and high performance of the entire optical system, power setting of each lens group has to be optimized. Below a lower limit value of the conditional expression (8), power (refractive power) of the first lens group L1 becomes excessively high. This situation is advantageous for shortening the total lens length. However, the amounts of various aberrations such as magnification chromatic aberrations become large, and difficult to be corrected with good balance.

Over an upper limit value, shortening the total lens length becomes difficult.

When power of the focusing lens group becomes excessively high below a lower limit value of the conditional expression (9), aberration fluctuations during focusing increase to deteriorate optical performance, especially in a short distance object.

When power of the focusing lens group becomes excessively low over an upper limit value, the amount of drawing out the lens group during focusing becomes large, and a moving space has to be secured, causing an increase of the total lens length.

In this case, the effective diameter of the focusing lens group is increased to result in higher weight, causing an increase of driving torque during focusing. Consequently, for example, when the optical system is applied to the camera including the automatic focusing detector, the driving motor is enlarged. Thus, this situation is not advantageous.

In each Embodiment, more preferably, numerical value ranges of the conditional expressions (4) and (6) to (9) are set as follows:

$$\nu d(Gn) < 50 \tag{4a}$$

$$1.30 < \theta gd(Gn) < 1.60 \tag{6a}$$

$$1.00 < Vp/Vn < 1.50 \tag{7a}$$

$$0.30 < F1/F < 0.60 \tag{8a}$$

$$0.12 < |F2/F| < 0.40 \tag{9a}$$

Next, features of the optical system of the telephoto type of each Embodiment will be described.

The optical system of the telephoto type is configured by disposing, from the expanded side, a front group (first lens group) G1 of a positive refractive power, and a rear group (second lens group) G2 of a negative refractive power.

Thus, when a height hi from an optical axis of a paraxial marginal ray Q most passing through a surface of the expanded side is compared with a height h2 from the paraxial marginal ray in a surface where a height of the paraxial marginal ray Q is highest among surfaces of the rear group G2, the height hi is higher than the height h2.

Next, consideration will be given to the optical system before the refractive optical element Gn is introduced. An aberration coefficient (T) of magnification chromatic aberrations of the front and rear groups G1 and G2 is represented by the following expression (1):

$$T(\lambda) = h_{G1}(\lambda_0)H_{G1}(\lambda_0)\sum_{i=1}^{L}\phi_{G1j}(\lambda_0)/v_{G1j}(\lambda) + \qquad \text{[Expression 1]}$$

$$h_{G2}(\lambda_0)H_{G2}(\lambda_0)\sum_{j=1}^{M}\phi_{G2i}(\lambda_0)/v_{G2j}(\lambda)$$

(a)

Each element is as follows:

$vG1i(\lambda)=\{NG1i(\lambda 0)-1\}/\{NG1i(\lambda)-NG1i(\lambda 0)\}$ $vG2i(\lambda)=\{NG2j(\lambda 0)-1\}/\{NG2j(\lambda)-NG2j(\lambda 0)\}$ φG1i: refractive power of each thin single lens constituting the front group G1

φG2i: refractive power of each thin single lens constituting the rear group G2 vG1i: Abbe number of material of each thin single lens constituting the front group G1 vG2i: Abbe number of material of each thin single lens constituting the rear group G2 hG1: height of paraxial marginal ray Q entering the front group G1 hG2: height of paraxial marginal ray Q entering the rear group G2

HG1: height of paraxial chief ray R entering the front group G1

HG2: height of paraxial chief ray R entering the rear group G2

NG1j: refractive index of material of each thin single lens constituting the front group G1

NG2i: refractive index of material of each thin single lens constituting the rear group G2

λ: optional wavelength

λ0: design wavelength

Generally, in wavelength dependence characteristics of the aberration coefficient of magnification chromatic aberrations of the expression (a), the optical system of the telephoto type exhibits wavelength dependence characteristics where overall inclination is negative and convex downward.

Next, consideration will be given to a code and an introduction position of the refractive optical element Gn for correcting magnification chromatic aberrations in the optical system from this state.

A magnification chromatic aberration coefficient TGn of the refractive optical element Gn to be introduced is represented by the following expression (b):

$TGn(\lambda)=hG1(\lambda 0)GG1(\lambda 0)\phi Gn(\lambda 0)/vGn(\lambda)$ (b)

In this case, the element vGn (λ) is represented by the following expression (c).

$vGn(\lambda)=\{NGn(\lambda 0)-1\}/\{NGn(\lambda)-NGIn\lambda 0)\}$ (c)

In the expressions (b) and (c), 1/vGn (λ) directly reflects a tendency of inclination and curve components of dispersion characteristics NGn (λ) of the refractive optical element Gn. When the refractive optical element Gn is disposed closer to the expanded side than the point P, in the case of φGn (λ0)>0, wavelength dependence characteristics of the aberration coefficient of the magnification aberrations of the refractive optical element Gn exhibit a curve positive in overall inclination and convex upward.

In the case of φGIT (λ0)<0, wavelength dependence characteristics of the aberration coefficient of the magnification chromatic aberrations of the refractive optical element Gn exhibit a curve negative in overall inclination and convex downward.

On the other hand, when the refractive optical element Gn is disposed closer to the reduced side than the point P, in the case of refractive optical element φGn (λ0)>0, wavelength dependence characteristics of the aberration coefficient of the magnification chromatic aberrations of the refractive optical element GN exhibit a curve negative in overall inclination and convex downward.

In the case of φGn (λ0)<0, wavelength dependence characteristics of the aberration coefficient of the magnification chromatic aberrations of the refractive optical element Gn exhibit a curve positive in overall inclination and convex upward.

Thus, to cancel all curve components of the wavelength dependence characteristic curve of the aberration coefficient of the magnification chromatic aberrations in the entire system of the expression (a), when the refractive optical element Gn is disposed closer to the expanded side than the point P, φGn (λ0)>0 has to be set in the front group G1.

When the refractive optical element Gn is disposed closer to the reduced side than the point P, φGn (λ0)<0 has to be set in the front group G1.

In the optical system of the telephoto type of each Embodiment, the entire system is miniaturized, and reduced in weight. The optical system of the telephoto type of each Embodiment generally includes a first lens group of a positive refractive power and a second lens group of a negative refractive power sequentially from the expanded side to the reduced side.

When the focusing lens group is large and high in weight, driving torque during focusing is increased. For example, when the optical system is applied to an automatic focusing detector, the driving motor is enlarged. Besides, focusing takes much time. This situation is disadvantageous.

Thus, in each embodiment, the second lens group relatively small as a whole is moved to perform focusing.

In such an optical system of a telephoto type, magnification chromatic aberrations generated in the first lens group closest to the object are corrected by magnification chromatic aberrations generated in the second lens group and the last lens group closest to the image (fifth lens group L5 in Embodiments 1 to 4, and third lens group in Embodiment 5). In other words, canceling each other reduces magnification chromatic aberrations of the entire system.

Generally, to miniaturize the focusing lens group, the focusing lens group is disposed near the aperture stop SP. In the vicinity of the aperture stop SP, a height from an optical axis of a paraxial chief ray is reduced, consequently reducing the amount of magnification chromatic aberrations generated in the focusing lens group.

Thus, the magnification chromatic aberrations generated in the first lens group have to be canceled by magnification chromatic aberrations generated in a reverse direction in the last lens group closest to the image, resulting in a correction shortage tendency of the magnification chromatic aberrations.

Especially, deterioration of a secondary spectrum of the magnification chromatic aberrations becomes a problem. In the optical system of each Embodiment, the refractive optical element Gn having a negative refractive power to satisfy the conditional expressions (1) to (3) is disposed closer to the point P.

In the optical system which includes the first lens group of a positive refractive power and the second lens group of a negative refractive power sequentially from the object side to the image side, and the aperture stop in the optical path, the refractive optical element Gn which satisfies the conditional expressions (1) to (3) is disposed closer to the reduced side (image side) than the aperture stop SP.

As a result, the focusing lens group can be miniaturized without deteriorating magnification chromatic aberrations.

The solid-state material used in each Embodiment is, for example, a resin. For the solid-state material, for example, a mixture where inorganic fine particles are dispersed in a transparent medium is used.

The inorganic fine particles are, for example, titanium oxide (TiO2) fine particles. For the solid-state material in each Embodiment, a material formed by photopolymerization or thermal polymerization using forming die can be applied.

In each embodiment, a specific example of the solid-state optical material that satisfies the conditional expressions (1) and (2) is a resin. Among various resins, especially a UV-curing resin (nd=1.635, vd=22.7, and θgF=0.69) and N-polyvinyl carbazole (nd=1.696, vd=17.7, and θgF=0.69) are optical materials which satisfy the conditional expressions (1) and (2). However, each Embodiment is not limited to these materials.

As a material having characteristics different from those of a general nitric material, a mixture where the following inorganic oxide fine particles are disposed in a synthetic resin can be used. That is, TiO2 (nd=2.304, and vd=13.8), Nb2O5 (nd=2.4367, and vd=14.0), and ITO (nd=1.8581, and vd=5.53) are available. Others such as Cr2O3 (nd=2.2178, and vd=13.4) and BaTiO2 (nd=2.304, vd=13.8, and θgF=0.87) are also available. When TiO2 (nd=2.304, vd=13.8, and θgF=0.87) fine particles among others are dispersed in a synthetic resin, a material becomes a material which satisfies the conditional expressions (1) and (2).

TiO2 is a material used for various purposes, and used as a deposition material constituting an optical thin film such as a reflection prevention film in an optical field. In addition, TiO2 fine particles are used as a photocatalyst, a white pigment, or a cosmetic material.

An average diameter of the TiO2 fine particles is preferably about 2 nm to 50 nm in view of an influence of scattering, and dispersants may be added to suppress aggregation.

A polymer is preferable as a medium material for dispersing TiO2, and high productivity can be obtained by photopolymerization or thermal polymerization using a forming die.

In view of optical constant characteristics of a polymer, a polymer of a relatively large partial dispersion ratio, a polymer of a relatively small Abbe number, or a polymer which satisfies both is preferable, such as N-polyvinyl carbazole, styrene, or polymethacrylic acid methyl (acryl). In Embodiment described below, a UV-curing resin or N-polyvinyl carbazole is used as a host polymer for dispersing TiO2 fine particles. However, materials are not limited to these.

Dispersion characteristics $N(\lambda)$ of a mixture where nano-fine particles are dispersed can be easily calculated by the following expression derived from well-known Drude expression:

$$N(\lambda)=[1+V\{NTiO2(\lambda)-1\}+(1-V)\{NP2(\lambda)-1\}]^{1/2} \quad (d)$$

In the expression, $\lambda$ denotes an optional wavelength, NTIO denotes a refractive index of TiO2, NP denotes a refractive index of a polymer, and V denotes a fraction of a total volume of TiO2 fine particles with respect to a polymer volume.

Specific numerical value data of numerical value Embodiments 1 to 5 corresponding to Embodiments 1 to 5 will be described below. In each numerical value Embodiment, i denotes a surface number from the object side, and Ri denotes a curvature radius of an i-th optical surface (i-th surface). Di denotes an on-axis space between the i-th surface and a (i+1)-th surface. Ni and vI respectively denote a refractive index and an Abbe number of a material of an i-th dioptric member with respect to the d-line.

A refraction index and an Abbe number of the UV-curing resin, TiO2, or its fine particle dispersed material with respect to the d, g, C, and F-lines are respectively represented by partial dispersion ratios θgd and θgF.

An aspherical shape is represented by the following expression (2), where X denotes a displacement amount of an optical axis direction from a surface apex, h denotes a height from an optical axis in a direction perpendicular to the optical axis, r denotes a paraxial curvature radius, k denotes a conical constant, and B, C, D, E . . . denote aspherical coefficients of orders:

$$x(h) = \frac{(1/r)h^2}{1+\sqrt{\{1-(1+k)(h/r^2)\}}} + Bh^4 + Ch^6 + Dh^8 + Eh^{10} + \ldots \quad \text{[Expression 2]}$$

In each aspherical coefficient, "F±CC" means "×10±XX". Table 1 shows a relationship between each conditional expression and numerical value embodiment.

[NUMERICAL EXAMPLE 1]

| | R | D | Nd | vd |
|---|---|---|---|---|
| 1 | ∞ | 6.00 | 1.51633 | 64.1 |
| 2 | ∞ | 1.50 | | |
| 3 | 238.08021 | 18.94 | 1.43387 | 95.1 |
| 4 | −526.27591 | 31.28 | | |
| 5 | 137.79350 | 16.20 | 1.43387 | 95.1 |
| 6 | −18469.60605 | 1.63 | | |
| 7 | −963.04958 | 5.90 | 1.72916 | 54.7 |
| 8 | 244.10184 | 46.34 | | |
| 9 | 78.71311 | 12.16 | 1.49700 | 81.5 |
| 10 | 201.58333 | 0.38 | | |
| 11 | 88.17068 | 5.50 | 1.73400 | 51.5 |
| 12 | 59.59035 | 102.64 | | |
| 13 | 258.37953 | 3.31 | 1.76182 | 26.5 |
| 14 | −201.40525 | 2.00 | 1.88300 | 40.8 |
| 15 | 99.25718 | 53.67 | | |
| 16 (aperture stop) | ∞ | 11.01 | | |
| 17 | 70.53447 | 1.80 | 1.80518 | 25.4 |
| 18 | 36.80733 | 5.04 | 1.51823 | 58.9 |
| 19 | −162.67733 | 4.51 | | |
| 20 | 120.35557 | 2.58 | 1.78472 | 25.7 |
| 21 | −129.55183 | 1.30 | 1.72916 | 54.7 |
| 22 | 50.65004 | 2.23 | | |
| 23 | −105.41308 | 1.30 | 1.80400 | 46.6 |

-continued

[NUMERICAL EXAMPLE 1]

| | | | |
|---|---|---|---|
| 24 | 102.01789 | 3.00 | | |
| 25 | 78.24830 | 4.32 | 1.51823 | 58.9 |
| 26 | −45.46741 | 1.00 | 1.58144 | 40.8 |
| 27 | −218.96863 | 17.30 | | |
| 28 | 182.54336 | 6.39 | 1.76182 | 26.5 |
| 29 | −70.45924 | 0.10 | NGn = 1.63555 | VGn = 22.7 |
| 30 | −186.32857 | 2.00 | 1.60311 | 60.6 |
| 31 | −3634.71344 | 10.00 | | |
| 32 | ∞ | 2.20 | 1.51633 | 64.1 |
| 33 | ∞ | | | |
| image plane | ∞ | | | |

Various parameters

| | |
|---|---|
| focal length | 780.00 |
| F-number | 5.80 |
| field angle | 3.18 |
| image height | 21.635 |
| total lens length | 484.47 |
| BF | 100.92 | focal lengths of lens units

| lens unit | most-object side surface | focal length |
|---|---|---|
| 1 | 1 | 322.16 |
| 2 | 13 | −154.45 |
| 3 | 16 | 146.67 |
| 4 | 20 | −43.75 |
| 5 | 25 | 76.49 |
| 1 | 1 | 322.16 |
| 2 | 13 | −154.45 |
| 3 | 16 | 1850.12 |

[NUMERICAL EXAMPLE 2]

| | R | D | Nd | vd |
|---|---|---|---|---|
| 1 | ∞ | 6.00 | 1.51633 | 64.1 |
| 2 | ∞ | 1.50 | | |
| 3 | 237.21251 | 19.21 | 1.43387 | 95.1 |
| 4 | −498.14086 | 30.00 | | |
| 5 | 137.10524 | 16.31 | 1.43387 | 95.1 |
| 6 | −9629.60466 | 1.68 | | |
| 7 | −891.68458 | 5.90 | 1.72916 | 54.7 |
| 8 | 236.05771 | 47.03 | | |
| 9 | 78.66780 | 12.19 | 1.49700 | 81.5 |
| 10 | 202.26017 | 0.28 | | |
| 11 | 87.75966 | 5.50 | 1.73400 | 51.5 |
| 12 | 59.68341 | 103.02 | | |
| 13 | 250.26761 | 3.35 | 1.76182 | 26.5 |
| 14 | −201.45971 | 2.00 | 1.88300 | 40.8 |
| 15 | 97.93061 | 53.68 | | |
| 16 (aperture stop) | ∞ | 10.43 | | |
| 17 | 69.62879 | 1.80 | 1.80518 | 25.4 |
| 18 | 35.31274 | 5.23 | 1.51823 | 58.9 |
| 19 | −169.95521 | 2.60 | | |
| 20 | 110.44535 | 2.63 | 1.78472 | 25.7 |
| 21 | −126.27702 | 1.30 | 1.72916 | 54.7 |
| 22 | 49.77052 | 2.26 | | |
| 23 | −104.91648 | 1.30 | 1.80400 | 46.6 |
| 24 | 107.80999 | 2.88 | | |
| 25 | 75.42582 | 3.14 | 1.51823 | 58.9 |
| 26 | −122.66358 | 1.00 | 1.60342 | 38.0 |
| 27 | −740.65578 | 15.50 | | |
| 28 | 174.90601 | 5.88 | 1.78472 | 25.7 |
| 29 | −93.63960 | 0.10 | NGn = 1.63555 | VGn = 22.7 |
| 30 | −719.95320 | 12.00 | | |
| 31 | ∞ | 2.20 | 1.51633 | 64.1 |
| 32 | ∞ | | | |

-continued

[NUMERICAL EXAMPLE 2]

| | |
|---|---|
| image plane | ∞ |

Various parameters

| | |
|---|---|
| focal length | 780.00 |
| F-number | 5.80 |
| field angle | 3.18 |
| image height | 21.635 |
| total lens length | 485.15 |
| BF | 107.26 | focal lengths of lens units

| lens unit | most-object side surface | focal length |
|---|---|---|
| 1 | 1 | 322.36 |
| 2 | 13 | −153.97 |
| 3 | 16 | 153.64 |
| 4 | 20 | −45.32 |
| 5 | 25 | 77.05 |
| 1 | 1 | 322.36 |
| 2 | 13 | −153.97 |
| 3 | 16 | 1767.98 |

[NUMERICAL EXAMPLE 3]

| | R | D | Nd | vd |
|---|---|---|---|---|
| 1 | ∞ | 6.00 | 1.51633 | 64.1 |
| 2 | ∞ | 1.50 | | |
| 3 | 243.34679 | 18.76 | 1.43387 | 95.1 |
| 4 | −521.90775 | 31.94 | | |
| 5 | 138.12638 | 16.36 | 1.43387 | 95.1 |
| 6 | −14791.73587 | 1.61 | | |
| 7 | −957.97578 | 5.90 | 1.72916 | 54.7 |
| 8 | 248.35920 | 46.34 | | |
| 9 | 78.58557 | 12.20 | 1.49700 | 81.5 |
| 10 | 200.59195 | 0.64 | | |
| 11 | 88.27562 | 5.50 | 1.73400 | 51.5 |
| 12 | 59.51346 | 103.09 | | |
| 13 | 250.07954 | 3.30 | 1.76182 | 26.5 |
| 14 | −206.24598 | 2.00 | 1.88300 | 40.8 |
| 15 | 97.04491 | 51.64 | | |
| 16 (aperture stop) | ∞ | 10.68 | | |
| 17 | 68.50991 | 1.80 | 1.80518 | 25.4 |
| 18 | 35.83004 | 4.47 | 1.51823 | 58.9 |
| 19 | −162.50188 | 4.49 | | |
| 20 | 106.87404 | 2.53 | 1.78472 | 25.7 |
| 21 | −168.06254 | 1.30 | 1.72916 | 54.7 |
| 22 | 48.53412 | 2.34 | | |
| 23 | −98.23787 | 1.30 | 1.80400 | 46.6 |
| 24 | 111.45880 | 3.13 | | |
| 25 | 78.88390 | 4.40 | 1.51823 | 58.9 |
| 26 | −43.86003 | 1.00 | 1.57501 | 41.5 |
| 27 | −193.51173 | 18.51 | | |
| 28 | 223.27355 | 5.75 | 1.72151 | 29.2 |
| 29 | −66.05508 | 0.10 | NGn = 1.55324 | NGn = 39.8 |
| 30 | 1632.25260 | 2.00 | 1.56384 | 60.7 |
| 31 | 5957.42397 | 39.02 | | |
| 32 | ∞ | 2.20 | 1.51633 | 64.1 |
| 33 | ∞ | | | |
| image plane | ∞ | | | |

Various parameters

| | |
|---|---|
| focal length | 780.00 |
| F-number | 5.80 |
| field angle | 3.18 |
| image height | 21.635 |
| total lens length | 483.63 |

-continued

[NUMERICAL EXAMPLE 3]

| | | |
|---|---|---|
| BF | | 71.84 | focal lengths of lens units

| lens unit | most-object side surface | focal length |
|---|---|---|
| 1 | 1 | 322.81 |
| 2 | 13 | −152.42 |
| 3 | 16 | 143.81 |
| 4 | 20 | −44.26 |
| 5 | 25 | 78.03 |
| 1 | 1 | 322.81 |
| 2 | 13 | −152.42 |
| 3 | 16 | 1766.15 |

[NUMERICAL EXAMPLE 4]

| | R | D | Nd | vd |
|---|---|---|---|---|
| 1 | ∞ | 6.00 | 1.51633 | 64.1 |
| 2 | ∞ | 1.50 | | |
| 3 | 248.99767 | 18.69 | 1.43387 | 95.1 |
| 4 | −501.08310 | 32.11 | | |
| 5 | 140.36576 | 16.20 | 1.43387 | 95.1 |
| 6 | −5818.51622 | 1.57 | | |
| 7 | −892.72624 | 5.90 | 1.72916 | 54.7 |
| 8 | 254.61688 | 48.94 | | |
| 9 | 78.56861 | 12.01 | 1.49700 | 81.5 |
| 10 | 197.09971 | 0.53 | | |
| 11 | 88.10284 | 5.50 | 1.73400 | 51.5 |
| 12 | 59.90065 | 101.46 | | |
| 13 | 235.24205 | 3.25 | 1.76182 | 26.5 |
| 14 | −214.42384 | 2.00 | 1.88300 | 40.8 |
| 15 | 95.72225 | 52.87 | | |
| 16 (aperture stop) | ∞ | 11.79 | | |
| 17 | 66.15341 | 1.80 | 1.80518 | 25.4 |
| 18 | 33.21558 | 4.68 | 1.51823 | 58.9 |
| 19 | −158.82635 | 2.77 | | |
| 20 | 93.65889 | 2.45 | 1.78472 | 25.7 |
| 21 | −268.57721 | 1.30 | 1.72916 | 54.7 |
| 22 | 45.54849 | 2.48 | | |
| 23 | −91.65730 | 1.30 | 1.80400 | 46.6 |
| 24 | 122.90763 | 2.98 | | |
| 25 | 78.85424 | 3.80 | 1.48749 | 70.2 |
| 26 | −62.50992 | 1.00 | 1.62588 | 35.7 |
| 27 | −255.98616 | 13.51 | | |
| 28 | 204.56517 | 6.50 | 1.74077 | 27.8 |
| 29 | −59.45162 | 0.10 | NGn = 1.55324 | NGn = 39.8 |
| 30* | −887.47572 | 12.00 | | |
| 31 | ∞ | 2.20 | 1.51633 | 64.1 |
| 32 | ∞ | | | |

Various parameters

| | |
|---|---|
| focal length | 780.00 |
| F-number | 5.80 |
| field angle | 3.18 |
| image height | 21.635 |
| total lens length | 485.38 |
| BF | 106.20 | surface 30 k = 0.000000E+00   b = −2.186288E−09   c = −7.104773E−12
d = −3.588118E−13   e = 6.479557E−16 focal lengths of lens units

| lens unit | most-object side surface | focal length |
|---|---|---|

-continued

[NUMERICAL EXAMPLE 4]

| 1 | 1 | 321.47 |
|---|---|---|
| 2 | 13 | −154.64 |
| 3 | 16 | 146.54 |
| 4 | 20 | −44.40 |
| 5 | 25 | 77.57 |
| 1 | 1 | 321.47 |
| 2 | 13 | −154.64 |
| 3 | 16 | 2050.46 |

[NUMERICAL EXAMPLE 5]

| | R | D | Nd | vd |
|---|---|---|---|---|
| 1 | ∞ | 6.00 | 1.51633 | 64.1 |
| 2 | ∞ | 1.50 | | |
| 3 | 236.92597 | 19.50 | 1.43387 | 95.1 |
| 4 | −469.15176 | 36.59 | | |
| 5 | 134.37383 | 15.67 | 1.43387 | 95.1 |
| 6 | 5816.64898 | 2.17 | | |
| 7 | −817.64426 | 5.90 | 1.72916 | 54.7 |
| 8 | 253.37464 | 47.29 | | |
| 9 | 79.58893 | 12.15 | 1.49700 | 81.5 |
| 10 | 224.55858 | 1.23 | | |
| 11 | 94.47835 | 5.50 | 1.73400 | 51.5 |
| 12 | 60.32167 | 98.06 | | |
| 13 | 482.85167 | 3.03 | 1.76182 | 26.5 |
| 14 | −153.68009 | 2.00 | 1.88300 | 40.8 |
| 15 | 114.10052 | 50.39 | | |
| 16 (aperture stop) | ∞ | 15.92 | | |
| 17 | 63.09136 | 3.55 | 1.51633 | 64.1 |
| 18 | −174.78037 | 2.15 | | |
| 19 | 207.07427 | 2.66 | 1.58267 | 46.4 |
| 20 | −88.48685 | 1.30 | 1.74400 | 44.8 |
| 21 | 47.49499 | 51.32 | | |
| 22 | 312.85056 | 7.58 | 1.74077 | 27.8 |
| 23 | −40.24751 | 0.10 | NGn = 1.63555 | VGn = 22.7 |
| 24 | −57.16762 | 2.00 | 1.76200 | 40.1 |
| 25 | −1193.63059 | 10.00 | | |
| 26 | ∞ | 2.20 | 1.51633 | 64.1 |
| 27 | ∞ | | | |
| image plane | ∞ | | | |

Various parameters

| | |
|---|---|
| focal length | 780.00 |
| F-number | 5.80 |
| field angle | 3.18 |
| image height | 21.635 |
| total lens length | 480.76 |
| BF | 100.92 | focal lengths of lens units

| lens unit | most-object side surface | focal length |
|---|---|---|
| 1 | 1 | 327.89 |
| 2 | 13 | −144.51 |
| 3 | 16 | 863.19 |

TABLE 1

(TABLE SHOWING CONDITIONAL EXPRESSIONS IN EACH NUMERICAL EXAMPLE)

| CONDITIONAL EXPRESSION | | NUMERICAL EXAMPLE 1 | NUMERICAL EXAMPLE 2 | NUMERICAL EXAMPLE 3 | NUMERICAL EXAMPLE 4 | NUMERICAL EXAMPLE 5 |
|---|---|---|---|---|---|---|
| (1) | Vd (Gn) | 22.7 | 22.7 | 39.8 | 39.8 | 22.7 |
|  | θgF (Gn) | 0.689 | 0.689 | 0.665 | 0.665 | 0.689 |
| (2) | θgF (Gn) | 0.689 | 0.689 | 0.665 | 0.665 | 0.689 |
| (3) | \|FGn/Fr\| | 2.331 | 2.198 | 1.471 | 1.485 | 0.248 |
| (4) | Vd (Gn) | 22.7 | 22.7 | 39.8 | 39.8 | 22.7 |
| (5) | Vd (Gn) | 22.7 | 22.7 | 39.8 | 39.8 | 22.7 |
|  | θgd (Gn) | 1.422 | 1.422 | 1.385 | 1.385 | 1.422 |
| (6) | θgd (Gn) | 1.422 | 1.422 | 1.385 | 1.385 | 1.422 |
| (7) | Vp/Vn | 1.033 | 1.393 | 1.220 | 1.298 | 1.034 |
| (8) | F1/F | 0.413 | 0.413 | 0.414 | 0.412 | 0.420 |
| (9) | \|F2/F\| | 0.198 | 0.197 | 0.195 | 0.198 | 0.185 |

|  | UV-curing resin | TiO$_2$ | TiO$_2$ 3%-UV-curing resin 2 |
|---|---|---|---|
| d-LINE REFRACTIVE INDEX | 1.63555 | 2.30377 | 1.55324 |
| g-LINE REFRACTIVE INDEX | 1.67532 | 2.45676 | 1.57249 |
| C-LINE REFRACTIVE INDEX | 1.62807 | 2.28032 | 1.54936 |
| F-LINE REFRACTIVE INDEX | 1.65604 | 2.37452 | 1.56326 |
| vd | 22.7 | 13.8 | 39.8 |
| θgd | 1.422 | 1.624 | 1.385 |
| θgF | 0.689 | 0.873 | 0.665 |

Next, referring to FIG. 12, Embodiment of a digital still camera which uses the optical system of each Embodiment as an image-taking optical system will be described.

In FIG. 12, reference numerals 20 to 22 respectively denote a camera main body, an image-taking optical system configured by the optical system of one of Embodiments 1 to 5, and a solid-state image-taking device (photoelectric transducer) such as a CCD sensor or a CMOS sensor incorporated in the camera main body to receive an object image formed by the image-taking optical system 21.

Reference numeral 23 denotes a memory for recording information corresponding to the object image subjected to photoelectric conversion by the solid-state image-taking device 22. Reference numeral 24 denotes a viewfinder constituted of a liquid crystal display panel and provided to observe the object image formed by the solid-state image-taking device 22.

Thus, by applying the optical system of the present invention to the digital still camera, miniaturization of an image-taking apparatus (optical apparatus) having high optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-314595, filed on Dec. 5, 2007, which is hereby incorporated by reference herein in its entirety.

What is claimed is:

1. An optical system in which a maximum value of a height from an optical axis of a paraxial marginal ray closer to an expanded side than a point P, P denoting a point of intersection between an optical axis and a paraxial chief ray, and in a lens surface of the expanded side is larger than a maximum value of a height from an optical axis closer to a reduced side than the point P in which the paraxial marginal ray passes through the lens surface, the optical system comprising:

closer to the reduced side than the point P, a lens unit Lr including at least one refractive optical element Gn of a negative refractive power in which light entrance and exit surfaces are both refractive surfaces made of solid-state material, wherein when an Abbe number of a material of the refractive optical element Gn is νd (Gn), a partial dispersion ratio regarding g and F-lines is θgF (Gn), and a focal length of the refractive optical element Gn is FGn, a focal length of the lens unit Lr is Fr, the following conditions are satisfied:

$$-2.100 \times 10^{-3} \cdot \nu d(Gn) + 0.693 < \theta gF(Gn)$$

$$0.55 < \theta gF(Gn) < 0.90$$

$$0.02 < |FGn/Fr| < 10.00.$$

2. An optical system comprising:

sequentially from an object side to an image side, a first lens unit of a positive refractive power and a second lens unit of a negative refractive power;

an aperture stop; and closer to a reduced side than the aperture stop, a lens unit Lr including at least one refractive optical element Gn of a negative refractive power in which light entrance and exit surfaces are both refractive surfaces made of solid-state material, wherein when an Abbe number of a material of the refractive optical element Gn, and a partial dispersion ratio regarding g and F-lines are respectively νd (Gn) and θgF (Gn), and focal lengths of the refractive optical element Gn and the lens unit Lr are respectively FGn and Fr, the following conditions are satisfied:

$$-2.100 \times 10^{-3} \cdot \nu d(Gn) + 0.693 < \theta gF(Gn)$$

$$0.55 < \theta gF(Gn) < 0.90$$

$$0.02 < |FGn/Fr| < 10.00.$$

3. An optical system according to claim 1, wherein the Abbe number νd (Gn) satisfies the following condition:

$$\nu d(Gn) < 60.$$

4. An optical system according to claim 1 wherein when a partial dispersion ratio of g and d-lines of the refractive optical element Gn is θgd (Gn), the following conditions are satisfied:

$$-2.407 \times 10^{-3} \cdot \nu d(Gn) + 1.420 < \theta gd(Gn)$$

$$1.255 < \theta gd(Gn) < 1.670.$$

5. An optical system according to claim 1, wherein at least one surface among light entrance surfaces of the refractive optical element Gn is aspherical in shape.

6. An optical system according to claim 1, wherein at least one surface among light entrance surfaces of the refractive optical element Gn is in contact with air.

7. An optical system according to claim 1, further comprising, sequentially from the object side to the image side, a first lens unit of a positive refractive power which is immobile during focusing, and a second lens unit of a negative refractive power which moves in an optical axis direction for focusing.

8. An optical system according to claim 1, wherein when average Abbe numbers of materials of lenses of positive refractive powers and negative refractive powers in the lens unit Lr are respectively Vp and Vn, the following condition is satisfied:

$$0.8 < Vp/Vn < 1.8.$$

9. An optical system according to claim 1, further comprising, sequentially from the object side to the image side, a first lens unit of a positive refractive power which is immobile during focusing, and a second lens unit of a negative refractive power which moves in an optical axis direction for focusing, wherein when focal lengths of the first and second lens units and the entire system are respectively F1, F2, and F, the following conditions are satisfied:

$$0.2 < F1/F < 0.7$$

$$0.1 < |F2/F| < 0.5.$$

10. An optical system according to claim 1, further comprising, sequentially from the object side to the image side, a first lens unit of a positive refractive power which is immobile during focusing, a second lens unit of a negative refractive power which moves in an optical axis direction for focusing, an aperture stop, a third lens unit of a positive refractive power which is immobile during focusing, a fourth lens unit of a negative refractive power which moves in a direction perpendicular to the optical axis to displace the image, and a fifth lens unit of a positive refractive power which is immobile during focusing, wherein the refractive optical element Gn is included in the fifth lens unit.

11. An optical system according to claim 1, further comprising, sequentially from the object side to the image side, a first lens unit of a positive refractive power which is immobile during focusing, a second lens unit of a negative refractive power which moves in an optical axis direction for focusing, an aperture stop, and a third lens of a positive refractive power which is immobile during focusing, wherein the refractive optical element Gn is included in the third lens unit.

12. An optical apparatus comprising:
the optical system of claim 1.

* * * * *